United States Patent
Takada et al.

(10) Patent No.: US 7,885,796 B2
(45) Date of Patent: Feb. 8, 2011

(54) PARALLEL CALCULATION METHOD AND DEVICE

(75) Inventors: Toshikazu Takada, Tokyo (JP); Jun-ichi Yamamoto, Tokyo (JP); Kazuto Nakata, Tokyo (JP)

(73) Assignee: NEC Soft, Ltd., Tokyo (JP)

( * ) Notice: Subject to any disclaimer, the term of this patent is extended or adjusted under 35 U.S.C. 154(b) by 1135 days.

(21) Appl. No.: 10/572,745

(22) PCT Filed: Sep. 21, 2004

(86) PCT No.: PCT/JP2004/013734

§ 371 (c)(1),
(2), (4) Date: Mar. 21, 2006

(87) PCT Pub. No.: WO2005/029352

PCT Pub. Date: Mar. 31, 2005

(65) Prior Publication Data

US 2006/0271301 A1 Nov. 30, 2006

(30) Foreign Application Priority Data

Sep. 22, 2003 (JP) .............................. 2003-330290

(51) Int. Cl.
*G06G 7/48* (2006.01)
*G06G 7/58* (2006.01)
*G01N 33/48* (2006.01)
*G01N 31/00* (2006.01)

(52) U.S. Cl. .............................. 703/11; 702/19; 702/22; 703/12

(58) Field of Classification Search ........................ None
See application file for complete search history.

(56) References Cited

U.S. PATENT DOCUMENTS

| 6,631,391 | B1 | 10/2003 | Inabata et al. |
| 6,799,151 | B1 | 9/2004 | Yamada et al. |
| 2003/0204576 | A1 | 10/2003 | Yamada et al. |
| 2004/0260529 | A1 | 12/2004 | Takada et al. |

FOREIGN PATENT DOCUMENTS

| JP | 61-058076 | 3/1986 |
| JP | 63-238653 | 10/1988 |
| JP | 09-050428 | 2/1997 |
| JP | 09-050458 | 2/1997 |
| JP | 2000-020501 A | 1/2000 |
| JP | 2000-293494 A | 10/2000 |
| JP | 2000-298658 A | 10/2000 |
| JP | 2000-305923 A | 11/2000 |
| JP | 2001-312485 A | 11/2001 |
| JP | 2003-099408 A | 4/2003 |

*Primary Examiner*—Eric S Dejong
(74) *Attorney, Agent, or Firm*—Foley & Lardner LLP

(57) ABSTRACT

A method for executing calculation of the Hartree-Fock method in a molecular orbital method by a distributed memory parallel computing system includes the steps of: using a computer cluster made up of a plurality of computers; dividing a density matrix into multiple density submatrixes and distributing them to the individual computers and storing therein; and executing calculation processes such as two-electron integration or the like relating to density submatrixes in each computer while sequentially transferring the multiple density submatrixes between the multiple computers.

10 Claims, 5 Drawing Sheets

|   | m | 1 | 2 | 3 | 4 | 5 | 6 | 7 | 8 | 9 |
|---|---|---|---|---|---|---|---|---|---|---|
| n |   |   |   |   |   |   |   |   |   |   |
| 1 |   | 1 | 9 | 8 | 7 | 6 | 5 | 4 | 3 | 2 |
| 2 |   | 2 | 1 | 9 | 8 | 7 | 6 | 5 | 4 | 3 |
| 3 |   | 3 | 2 | 1 | 9 | 8 | 7 | 6 | 5 | 4 |
| 4 |   | 4 | 3 | 2 | 1 | 9 | 8 | 7 | 6 | 5 |
| 5 |   | 5 | 4 | 3 | 2 | 1 | 9 | 8 | 7 | 6 |
| 6 |   | 6 | 5 | 4 | 3 | 2 | 1 | 9 | 8 | 7 |
| 7 |   | 7 | 6 | 5 | 4 | 3 | 2 | 1 | 9 | 8 |
| 8 |   | 8 | 7 | 6 | 5 | 4 | 3 | 2 | 1 | 9 |
| 9 |   | 9 | 8 | 7 | 6 | 5 | 4 | 3 | 2 | 1 |

FIG. 10

PARALLEL CALCULATION METHOD AND DEVICE

TECHNICAL FIELD

The present invention relates to a parallel computing method and system suitable for molecular simulation or the like, and in particular relates to a parallel computing method and system suitable for molecular orbital calculation by the RHF (Restricted Hartree-Fock) method.

BACKGROUND ART

With development of quantum chemistry theory and with advancement of computer technologies, it has become possible to perform precise simulations of structures and physical properties of molecules, and chemical bonds, molecular orbitals and electron states in molecules. This technique is generally called a molecular orbital method. Of the molecular orbital methods, an ab initio (non-empirical) molecular orbital method that in principal does not depend on empirical parameters needs an enormous computational amounts in order to solve Schrödinger equations even if it is performed by approximate calculations. Accordingly, it has been only possible to apply it to small molecules. However, with recent remarkable improvement in computer performance, it has become possible to perform ab initio molecular orbital method calculation of relatively large molecules including biological materials, so the technique has been able to be applied to, for example analysis and research of physiologically active substances.

There are several techniques in the ab initio molecular orbital method; the Hartree-Fock (HF) method is used as a most popular method for obtaining total energy of a molecule. The HF method is formalized as a method of solving a Roothaan equation (Eq. (1)), which is obtained by handling a Schrödinger equation by one-electron approximation and linear approximation.

$$FC = SC\epsilon \quad (1)$$

In Eq. (1), F and S are given as N×N matrixes, C is given as an M×N matrix and $\epsilon$ is an M-dimensional vector, where N is the number of atomic orbitals (AO) and M is the number of molecular orbitals (MO) in a molecule under analysis. F is called a Fock matrix, and is given as Eq. (2).

$$F_{rs} = H_{rs} + \sum_{t,u=1}^{N} D_{tu}\left[(rs|tu) - \frac{1}{2}(rt|su)\right] \quad (2)$$

where, D is called a density matrix and defined with MO coefficients C as in Eq. (3).

$$D_{tu} = 2\sum_{j=1}^{occ} C_{tj}C_{uj} \quad (3)$$

where, "occ" in symbol $\Sigma$ represents the summation for all the molecular orbitals occupied by electron. S, H, (rs|tu) are physical quantities called overlap integral, H-core integral and two-electron integral, respectively, and are represented with atomic orbits $\phi_r$ as in Eqs. (4) to (6).

$$S_{rs} = \int_{-\infty}^{\infty} \phi_r^* \phi_s d^3 x \quad (4)$$

$$H_{rs} = \int_{-\infty}^{\infty} \phi_r^* \left[-\frac{1}{2}\nabla^2 - \sum_{i}^{core} \frac{Z_i}{|r - R_i|}\right]\phi_s d^3 x \quad (5)$$

$$(rs|tu) = \int_{-\infty}^{\infty} \phi_r^*(1)\phi_s(1)\frac{1}{r_{12}}\phi_t^*(2)\phi_u(2) d^3 x \quad (6)$$

where, "core" in symbol I represents the summation for the nucleus. Incidentally, Eq. (1) is given in the form of a linear equation, but the Fock matrix F is determined depending on atomic orbitals $\phi_i$, so that it is actually a non-linear equation, which cannot be solved exactly. To solve this equation, a technique called SCF(Self-consistent filed) method is used.

As is well known, in the SCF method the calculation is carried out the

As is well known, in the SCF method the calculation is carried out the following sequence of:

[1] determining initial estimations of MO coefficients C;
[2] determining a density matrix D from MO coefficients C;
[3] determining a Fock matrix F using the obtained density matrix D;
[4] diagonalizing the Fock matrix F to determine an eigenvalue $\epsilon$ and a eigenvector;
[5] determining new MO coefficients C and a new density matrix D from the obtained eigenvector; and
[6] repeating steps [3] to [5] until density matrix D will not vary.

In the calculation of the SCF method, the most time-consuming part is the calculation step [3] of a Fock matrix F. The reason is that calculation of two-electron integral (rs|tu) needs to be repeated $N^4$ times. There have been some methods of storing the result of two-electron integrals once calculated into a storage device. However, when a large-scale calculation, e.g., N is some ten thousands, has to be done, an enormous amount of disk capacity is needed. So, in most cases a direct process is adopted which calculates two-electron integrals in a step-by-step basis. Accordingly, enhancement of the speed of calculating Fock matrix F will directly affect the speedup of the whole calculation of the SCF method.

To enhance the speed of the calculation of the molecular orbital method, there have been disclosed Japanese Patent Application Laid-open No. 2000-293494 (JP-A-2000-293494), Japanese Patent Application Laid-open No. 2001-312485 (JP-A-2001-312458) and Japanese Patent Application Laid-pen No. H9-50428 (JP-A-9-050428). Any of these methods uses a single host machine such as a vector computer for executing matrix calculation or the like, while using parallel computers or a cluster of computers to execute calculation of Fock matrixes F or calculation of two-electron integrals.

However, in these methods, matrix calculation such as diagonalization is done by the so-called host machine, these methods entail the problem that it is impossible to handle a matrix greater than the memory capacity of the host machine. To deal with this problem, there are countermeasures such as using a multiple number of host machines in parallel and others. However, this measure is not so easy to realize because it is costly. In recent years, owing to reduction in price and improvement in performance of general-purpose computers, it has become possible to construct a high-speed inexpensive system by use of a computer cluster. In a general-purpose computer cluster, the memory capacity per each computer is small compared to that of a high-performance computer, but the capacity of the total system can be made large if computers to be coupled are increased in number. Further, increasing the number of the coupled computers also leads to speedup. However, a cluster of general purpose computers entails the problem in that it is impossible for each single computer to execute matrix calculation of a large-scale molecule because of the memory capacity for single computer being low, and that it is impossible to hold the whole matrix on the memory of a single computer if the number of molecular orbitals amounts to some ten thousands.

Patent document 1: JP-A-2000-293494
Patent document 2: JP-A-2001-312485
Patent document 3: JP-A-9-050428

DISCLOSURE OF INVENTION

Problems to be Solved by the Invention:

As has been described, even if a parallel computer system such as a computer cluster is used, there have been many problems to be solved in order to achieve molecular orbital calculation in a large scale and at high speeds. In order to achieve molecular orbital calculation in a large scale and at high speeds, needed first is to establish a calculation method in which all the matrix elements are always stored in distributed memory areas and matrixes are neither collected nor calculated on a single computer. With this arrangement, the scale of computation only depends on the total memory capacity of the whole system without depending on the memory capacity of a single computer, and it becomes no longer necessary to employ a high-cost host machine. In other words, it is possible to achieve a large-scale computation by only increasing the number of low-cost computers connected. Needed secondly is to establish a technique to reduce the amount of computation in the above method. There has been a known method in which the amount of computation can be reduced to 1/16 when calculation is performed on a single computer. However, no method has been known when all the matrix elements are stored in distributed memory areas as described above. It is possible to realize speedup if the number of machines coupled in parallel is increased, and reduction, if possible, in the amount of computation makes further improvement possible, hence establishment of such a technique is important.

It is therefore an object of the present invention to provide a parallel computing method which makes it possible to execute calculation by devising algorithm even if density matrixes are divided and enables large-scale computation so that molecular orbital calculation for biopolymers and the like which were previously impossible to calculate, can be done.

It is another object of the present invention to provide a parallel computing system which makes it possible to execute calculation by devising algorithm even if density matrixes are divided and enables large-scale computation so that molecular orbital calculation for biopolymers and the like which were previously impossible to calculate, can be done.

Means for Solving the Problems:

A parallel computing method of the present invention includes the steps of: using a computer cluster made up of a plurality of computers; dividing a density matrix into multiple density submatrixes and distributing the multiple density submatrixes to the multiple computers and storing therein; and executing calculation processes on the density submatrixes in each of the computers while sequentially transferring the multiple density submatrixes between the multiple computers.

This parallel computing method is suitable for the aforementioned RHF method. According to the present invention, it is possible to achieve calculation of the RHF method even when the density matrix is distributed to multiple computers and stored therein, it is hence possible to reduce computational time. Also in the present invention, computational time can be shortened by halving the calculation of integrals using a duplication of the density matrix. It is also possible to further reduce computational time by preparing a density matrix and its duplications, in total four and using the symmetry of $(rs|tu) \Leftrightarrow (tu|rs)$ in two-electron integration.

A parallel computing system of the present invention is a parallel computing system for executing calculation of the Hartree-Fock method in a molecular orbital method, includes a computer cluster made up of a plurality of computers, wherein each of the computers includes: a matrix storage for storing density submatrixes which are divided from a density matrix; a transfer controller for performing transmission and reception of the density submatrixes with respect to the other computers in the computer cluster; and a calculation processor for performing a calculation on the density submatrix stored in the matrix storage, and wherein calculation processes on the density submatrixes are executed in each of the computers while the multiple density submatrixes are being sequentially transferred between the multiple computers.

The present invention relates to a calculating method of the Hartree-Fock method in which the density matrix is divided into density submatrixes, to enable generation of a Fock matrix by sequentially transferring the divided density submatrixes, reduce the amount of computation by increasing the work areas and by combination of different transfer orders, and reduce the amount of transfer by skipping one step in the transfer method. Since the method of the present invention is a method in which the scale of calculation is only dependent on the memory capacity of the whole system, it is possible to achieve large-scale calculation and reduce computational time by connecting a large number of computers in parallel.

BRIEF DESCRIPTION OF THE DRAWINGS

FIG. 10 is a chart for illustrating the presence or absence of calculation of two-electron integrals when two-electron integral (RS|TU) is rewritten as (m|n) and regarded as a matrix in the case where the number of node is 9.

BEST MODE FOR CARRYING OUT THE INVENTION

Figure 1:
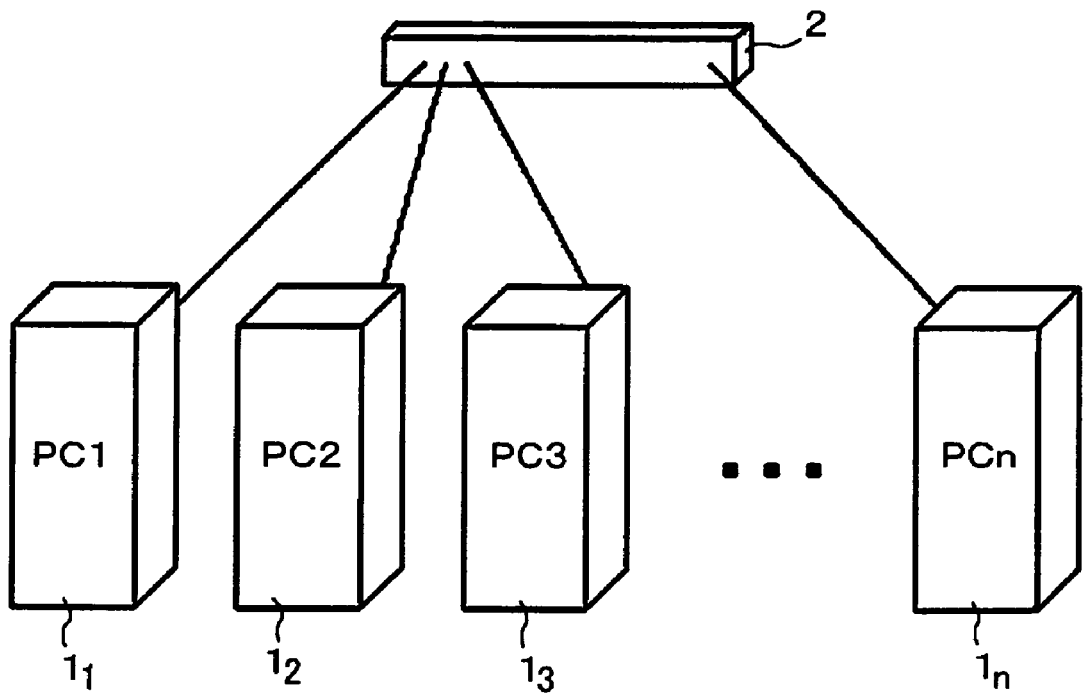
FIG. 1 is a block diagram showing a configuration of a parallel computing system constructed as distributed memory parallel computers or a PC cluster, in accordance with one embodiment of the present invention.
Figure 2:
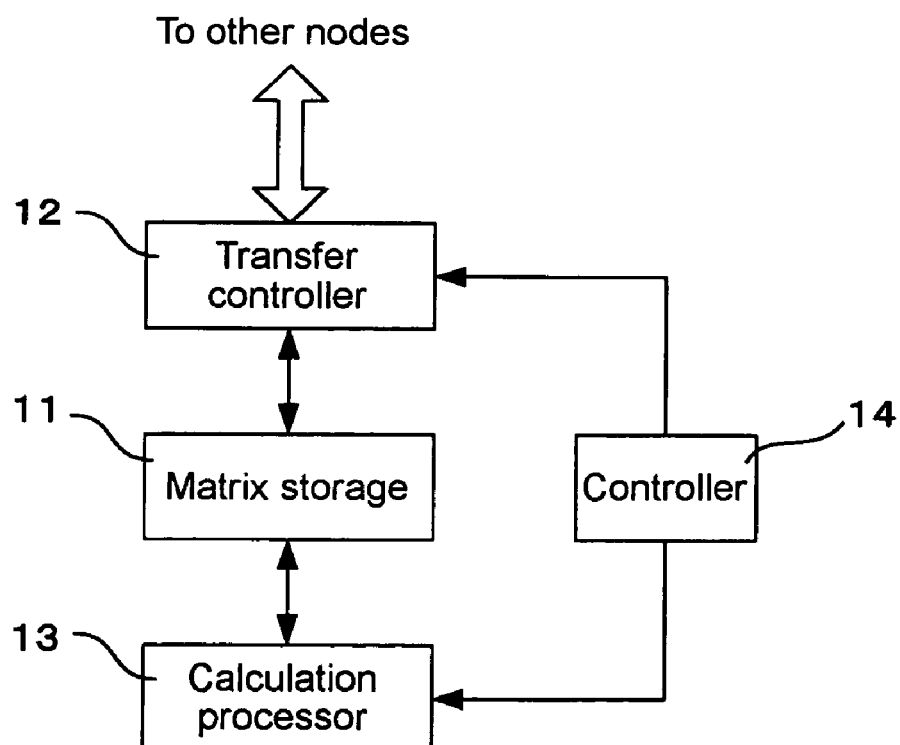
FIG. 2 is a block diagram showing a logical configuration of each computer.

In the present embodiment, a computer cluster or a system of distributed memory parallel computers shown in FIG. 1 is presumed. The computer system in one embodiment of the present invention shown in FIG. 1 includes a plurality of computers having equivalent capabilities coupled via communication devices. Since the conventional molecular orbital computing algorithm needs a large amount of memory, in most cases high-performance computers such as so-called super computers etc., have been used as the host computer. Since a high-performance computer is generally high in price, it sometimes entails the cost problem. Use of the method of the present invention, however, does not need such a host computer, it is hence possible to cut down the cost. In the example shown in FIG. 1, the computer system is constructed of a computer cluster made up of a plurality of (here n) computers $1_1$ to $1_n$ and a hub 2 having these computers $1_1$ to $1_n$ connected thereto. Since personal computers (PCs) are typically used as computers $1_1$ to $1_n$, this computer cluster is a PC cluster. Here, though a single hub 2 is used to connect multiple computers, the connecting form of individual computers is not limited to this. For example, computers may be connected to a ring type or bus type network. FIG. 2 is a block diagram showing a logical function of an individual computer as a constituent of the aforementioned computer cluster. In this embodiment, individual matrixes such as a density matrix and the like required for calculation of a Fock matrix is divided Into submatrixes, which are distributed to different nodes (different computers that constitute the computer cluster). In each node or computer, a calculation is performed for the submatrix stored therein or based on the submatrix, and the submatrixes are transferred between the nodes, to thereby obtain a final result (e.g., a Fock matrix) by iterating such calculations and transfer. To make each computer function in the above way, each computer (node) is composed of, as shown in FIG. 2, matrix storage 11 for storing a submatrix, transfer controller 12 for transferring the submatrix stored in matrix storage 11 to another node and receiving a submatrix from another node, calculation processor 13 for performing a calculation such as two-electron integration or the like to execute a calculation process on the submatrix in matrix storage 11, and controller 14 for controlling iteration control of calculations and transfer.

Figure 3:
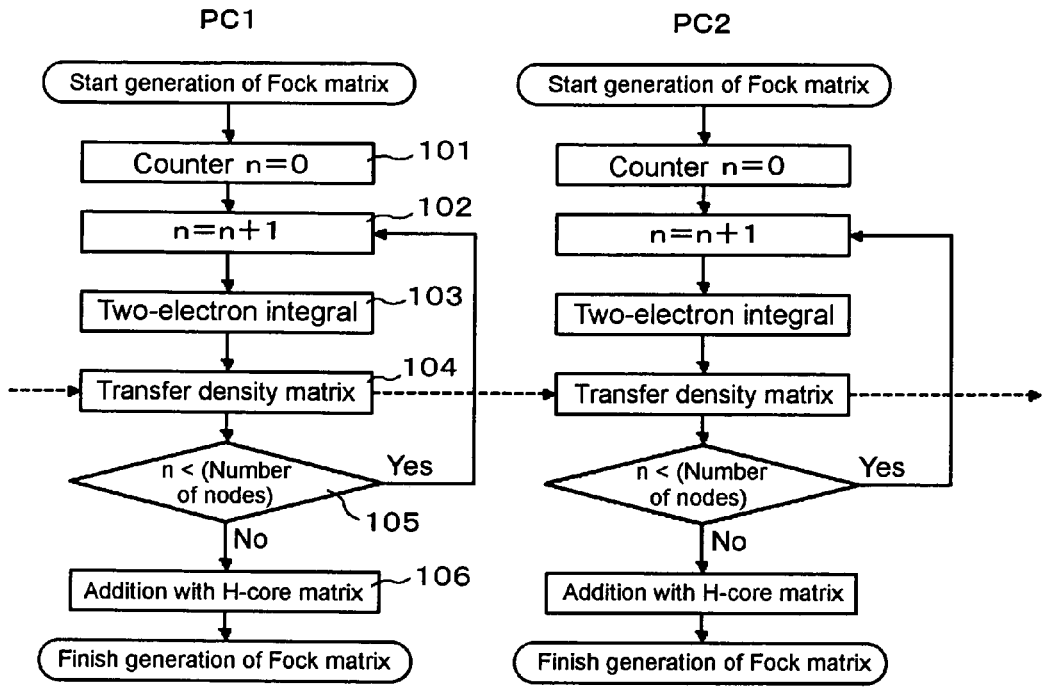
FIG. 3 is a flowchart showing an algorithm for generating a Fock matrix when a density matrix is divided, based on the parallel computing method of the present invention.
Figure 4:
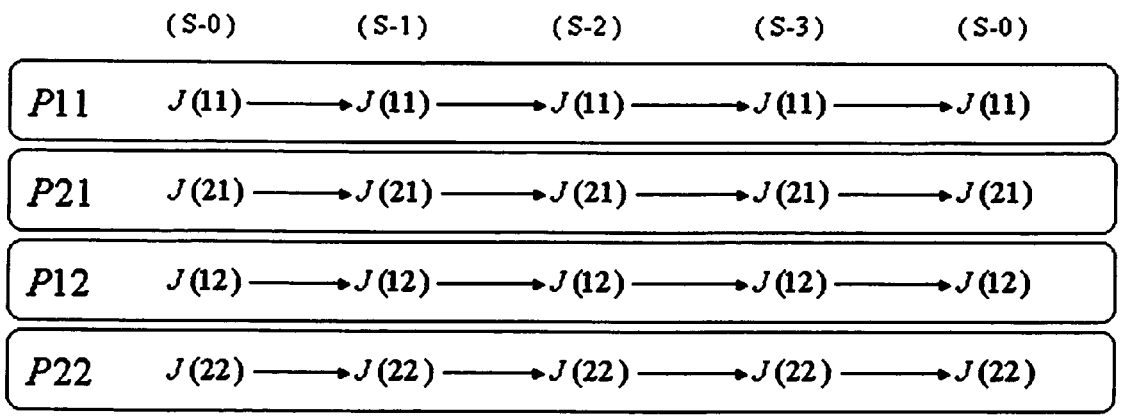
FIG. 4 is a chart showing the order of transfer to a region (RS) (matrix J(RS)) in a case with a node number of 4.

Next, the procedures of a Fock matrix generating algorithm when density matrix D is divided, in the parallel computing system In the present embodiment will be illustrated with reference to FIG. 3. In the method of the present embodiment, the density matrix is divided into multiple density submatrixes, so that these submatrixes are transferred from one node to another to repeat two-electron integration, and the final result is added to the H-core matrix to thereby form a Fock matrix. In FIG. 3, in order to illustrate transfer of density submatrixes between multiple nodes, the processes at two nodes PC1 and PC2 are shown in parallel.

To begin with, counter n is provided and the initial value of counter is set at 0 (n=0) at Step 101. Next, at Step 102, 1 is added to n, and at Step 103, two-electron integral is partially calculated, and the calculated two-electron integral value is used to perform the calculation of Eq. (2). Then at Step 104, the density density submatrix is transferred from node PC1 to node PC2. Since another density submatrix is sent to node PC1 from another node, node PC1 stores the received submatrix into the matrix storage, instead of the density submatrix that has been transferred to node PC2. Node PC2 transfers the density submatrix stored therein to still another node.

Then, at Step 105, it is determined whether counter n reaches the number of nodes (that is, the number of computers). If n<(the number of nodes), the operation loops back to Step 102 so as to repeat the processes from Steps 102 to 104, increments counter n by 1 and executes two-electron integration again. In this calculation, another portion different from the previous one is calculated in conformity with the transferred density submatrix. On the other hand, when counter n is equal to or exceeds the number of nodes at Step 105, it means that calculations of all the density submatrixes have been finished at all the nodes, hence the result is added to the H-core matrix or the like at Step 106, and the calculation is ended.

The parallel computing method of the present invention is not limited to the above. The present invention can be implemented in various embodiment modes, as will be described hereinbelow, by selecting submatrixes to be transferred and transfer modes. In the description hereinbelow, it is assumed that the number of nodes is 4 and the number of submatrixes into which a matrix is divided is 4, for description simplicity.

EXAMPLE 1

Cyclical Density Matrix Scheme

First, one embodiment called a cyclical density matrix scheme will be described. Again, Fock matrix F is defined as Eq. (7).

$$F_{rs} = H_{rs} + \sum_{t,u=1}^{N} D_{tu}\left[(rs \mid tu) - \frac{1}{2}(rt \mid su)\right] \qquad (7)$$

In Eq. (7), $F_{rs}$, $H_{rs}$, $D_{tu}$ (r, s, t, u=1, . . . , N) are matrixes. Since the number in which a matrix is divided is 4, r, s, t and u are each divided into two regions, as shown in Eq. (8).

$$R1, S1, T1, U1=1, \ldots, N/2, R2, S2, T2, U2=N/2+1, \ldots, N, \qquad (8)$$

With this regional division, a matrix is divided into four. The divided submatrixes are named as in Eq. (9).

$$\begin{array}{lll} F(11) = F_{R1S1} & H(11) = H_{R1S1} & D(aa) = D_{T1U1} \\ F(21) = F_{R2S1} & H(21) = H_{R2S1} & D(ba) = D_{T2U1} \\ F(12) = F_{R1S2} & H(12) = H_{R1S2} & D(ab) = D_{T1U2} \\ F(22) = F_{R2S2} & H(22) = H_{R2S2} & D(bb) = D_{T2U2} \end{array} \qquad (9)$$

When these are represented in an integrated manner, they can be represented as in Eq. (10).

$$\begin{array}{l} F(RS) = \{F(11), F(21), F(12), F(22)\} \\ F(RS) = \{H(11), H(21), H(12), H(22)\} \\ D(TU) = \{D(aa), D(ba), D(ab), D(bb)\} \end{array} \qquad (10)$$

These submatrixes are distributed to four nodes (computers). The nodes are named P11, P21, P12 and P22, and the submatrixes are allotted to each node as shown in Eq. (11). The state in which the matrixes are thus allotted will be called initial distribution state (S-0).

$$\begin{aligned} P11{:}F(11), H(11), D(aa) \\ P21{:}F(21), H(21), D(ba) \\ P12{:}F(12), H(12), D(ab) \\ P22{:}F(22), H(22), D(bb) \end{aligned} \quad (11)$$

Despite the summation for t and u in Eq. (7) has to be calculated over the whole region, density matrix D is only partly held at each node. It is therefore impossible to achieve the calculation without any measure. To deal with this, Eq. (7) should be calculated part by part every time density matrix D is transferred. The condition for making this method succeed is that each node should have a different submatrix of matrix D from the others at any time. As one such method, there is a method in which submatrixes are transferred cyclically. This will be done by calculating Eq. (7) following Eqs. (12) to (14).

$$\begin{aligned} P11{:}F(11) = H(11) + D(aa)G(11aa) + D(bb)G(11bb) + D(ab)G(11ab) + D(ba)G(11ba) \\ P21{:}F(21) = H(21) + D(ba)G(21ba) + D(aa)G(21aa) + D(bb)G(21bb) + D(ab)G(21ab) \\ P12{:}F(12) = H(12) + D(ab)G(12ab) + D(ba)G(12ba) + D(aa)G(12ab) + D(bb)G(12bb) \\ P22{:}F(22) = H(22) + D(bb)G(22bb) + D(ab)G(22ab) + D(ba)G(22ba) + D(aa)G(22aa) \end{aligned} \quad (12)$$

$$G(RSTU) = (RS \mid TU) - \frac{1}{2}(RU \mid TS) \quad (13)$$

$$R = \{R1, R2\}, \quad S = \{S1, S2\}, \quad T = \{T1, T2\}, \quad U = \{U1, U2\}, \quad (14)$$

Figure 5:
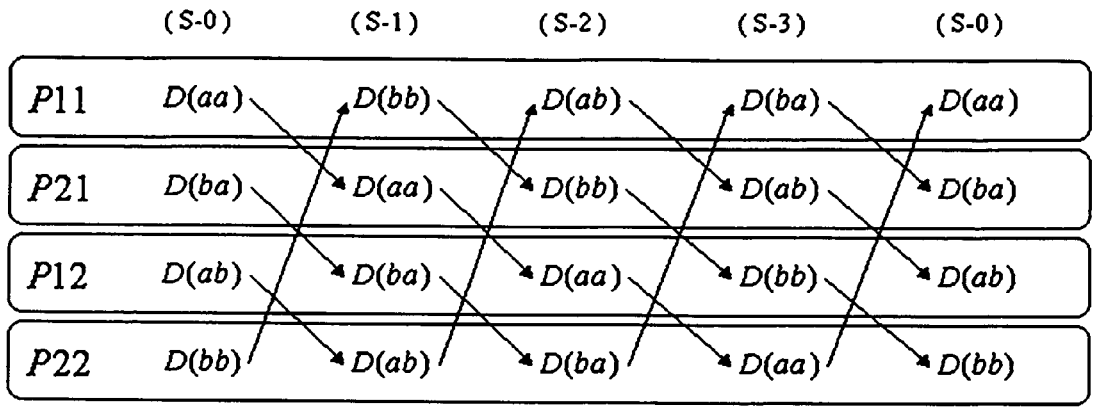
FIG. 5 is a chart showing the order of transfer to a region (TU) (matrix D(TU)) in a case with a node number of 4.
Figure 6:
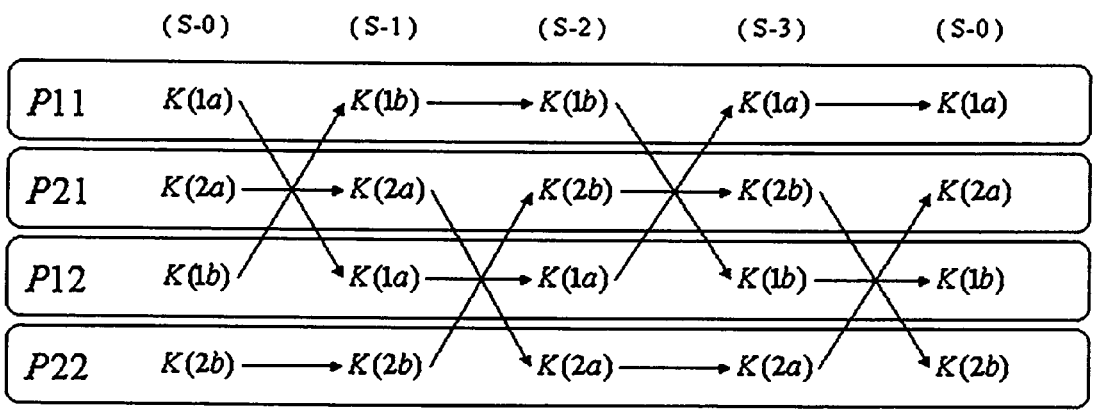
FIG. 6 is a chart showing the order of transfer to a region (RU) (matrix K(RU)) in a case with a node number of 4.

Here, since 1 and 2 denote the sub regions of R and S, and a and b denote the sub regions of T and U, the calculation should be executed by taking summation for all the regions while the summation symbols were omitted. Eq. (12) represents calculations on nodes P11 to P22, and each calculation can be done up to the second term in the initial distribution state (S-0). The third term and the following terms cannot be calculated until density matrix D has been transferred. When observing density matrix D only, it is understood that the order of transfer is done as shown in FIG. 5. In the chart, (S-0) to (S-3) are the names of distribution states that have changed after transfer. When observing submatrix D(aa), it is understood that the submatrix is circulated in the order of P11, P21, P12 and P22. In contrast, when observing node P21, it is understood that the density submatrixes circulate in the order of D(ba), D(aa), D(bb) and D(ab). In one word, all the density submatrixes have been sequentially transferred to node P21. Since the same is done for all the nodes, calculation of Eq. (7) can be made by transferring density submatrixes in the above order. In order to realize this transfer, it is convenient that the names of the nodes are renamed as in Eq. (15).

$$P(1)=P11, P(2)=P21, P(3)=P12, P(4)=P22 \quad (15)$$

With this manipulation, it is possible to realize the calculations by transfer, based on the algorithm including the following steps:

[1] calculating part of F;

[2] node P(i) sending the density submatrix stored therein to P(i+1);

[3] node P(i) receiving the density submatrix having been stored by P(i−1); and

[4] iterating steps [1] to [3] as many times as the number of nodes.

Since the case considered here has 4 nodes, a periodic boundary condition: i=i+4 is imposed on the node number i. As shown in FIG. 5, when as many times of transfer as the number of nodes have been done (4 times in this case), density submatrixes are fully cycled, the calculation ends as it returns to the initial distribution state (S-0).

EXAMPLE 2

Double Cyclical Density Matrix Scheme

Next, a mode called a double cyclical density matrix scheme will be described. In this mode, a duplication of density matrix D is used to halve the number of calculations for integration, thereby reduce computational time. The symbols used here are the same as those used in the aforementioned cyclical density matrix scheme. In this scheme, Eq. (7) is decomposed as in Eq. (16).

$$\begin{aligned} F_{rs} &= H_{rs} + J_{rs} - \frac{1}{2} K_{rs} \\ J_{rs} &= \sum_{t=1}^{N} \sum_{u=1}^{N} D_{tu}(rs \mid tu) \\ K_{ru} &= \sum_{t=1}^{N} \sum_{s=1}^{N} D_{ts}(rs \mid tu) \end{aligned} \quad (16)$$

where, J and K are matrixes presenting summations of Coulomb integrals and exchange integrals, respectively. This can be written down for every region and every node in a similar manner as for the case of the cyclical density matrix scheme, and Eqs. (17) and (18) are obtained.

$$\begin{aligned} P11{:}F(11) &= H(11) + J(11) - K(11)/2 \\ P21{:}F(21) &= H(21) + J(21) - K(21)/2 \\ P12{:}F(12) &= H(12) + J(12) - K(12)/2 \\ P22{:}F(22) &= H(22) + J(22) - K(22)/2 \end{aligned} \quad (17)$$

Figure 7:
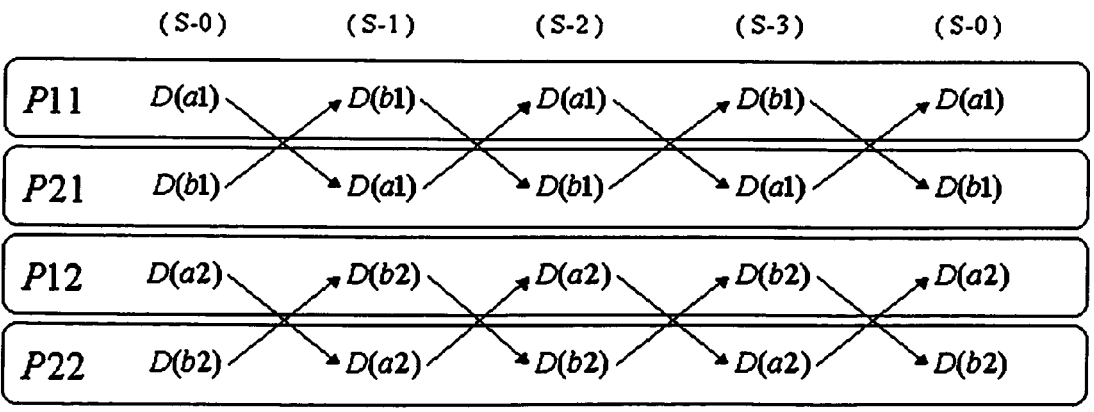
FIG. 7 is a chart showing the order of transfer to a region (TS) (matrix D(TS)) in a case with a node number of 4.

-continued $$
\begin{aligned}
P11{:}J(11) &= D(aa)(11\,|\,aa), & J(11) &= D(bb)(11\,|\,bb), \\
J(11) &= D(ab)(11\,|\,ab), & J(11) &= D(ba)(11\,|\,ba) \\
P21{:}J(21) &= D(ba)(21\,|\,ba), & J(21) &= D(aa)(21\,|\,aa), \\
J(21) &= D(bb)(21\,|\,bb), & J(21) &= D(ab)(21\,|\,ab) \\
P12{:}J(12) &= D(ab)(12\,|\,ab), & J(12) &= D(ba)(12\,|\,ba), \\
J(12) &= D(aa)(12\,|\,aa), & J(12) &= D(bb)(12\,|\,bb) \\
P22{:}J(22) &= D(bb)(22\,|\,bb), & J(22) &= D(ab)(22\,|\,ab), \\
J(22) &= D(ba)(22\,|\,ba), & J(22) &= D(aa)(22\,|\,aa) \\
P11{:}K(1a) &= D(a1)(11\,|\,aa), & K(1b) &= D(b1)(11\,|\,bb), \\
K(1b) &= D(a1)(11\,|\,ab), & K(1a) &= D(b1)(11\,|\,ba) \\
P21{:}K(2a) &= D(b1)(21\,|\,ba), & K(2a) &= D(a1)(21\,|\,aa), \\
K(2b) &= D(b1)(21\,|\,bb), & K(2b) &= D(a1)(21\,|\,ab) \\
P12{:}K(1b) &= D(a2)(12\,|\,ab), & K(1a) &= D(b2\,|\,ba), \\
K(1a) &= D(a2)(12\,|\,aa), & K(1b) &= D(b2)(12\,|\,bb) \\
P22{:}K(2b) &= D(b2)(22\,|\,bb), & K(2b) &= D(a2)(22\,|\,ab), \\
K(2a) &= D(b2)(22\,|\,ba), & K(2a) &= D(a2)(22\,|\,aa)
\end{aligned} \quad (18)
$$

where, two-electron integrals (rs|tu) calculated at each node are arranged so that they are equal to each other for every distribution states of J and K. In other words, they are arranged so that calculation of two-electron integrals (rs|tu) can be done at a time only. For this purpose, submatrixes of K should also be transferred. Transfers of matrixes J(RS), D(TU), K(RU) and D(TS) are done as shown in FIGS. 4 to 7. Transfer of K(RU) (R, S, T, U are regions) seems to be complicated at first sight, but It is easily understandable when rewritten as in FIG. 8. That is, for K(RU), transfer takes place between P11 and P12 and between P21 and P22 only while for D(TS) transfer takes place between P11 and P21 and between P12 and P22 only, as shown in FIG. 7. This can be more understandable when each node is rewritten as in Eq. (19).

$$P(1,1)=P11, P(2,1)=P21, P(1,2)=P12, P(2,2)=P12 \quad (19)$$

With the above rewriting,

[1] Transfer of K(RU) is performed only between nodes P(i, j) (i, j={1, 2}) that have the same i; and

[2] transfer of D(TS) is performed only between nodes P(i, j) (i, j={1, 2}) that have the same j.

There are cases where K(RU is transferred or not transferred. This can be determined based on the state number n(=0, 1, 2, . . . ) of distribution state (S-n) and cyclic period t (=1, 2, 3, . . . ). First, the cyclic period t is given by Eq. (20) when the number of nodes is m.

$$t=m/j_{max} \quad (20)$$

By use of this, the condition on which transfer of K(RU) occurs can be specifically written as Eq. (21).

$$i=(n \bmod t)+1 \quad (21)$$

Transfer should be caused to occur next time only at nodes P(i, j) at which this condition holds. In the following description, Eq. (21) is called the transfer condition. A computing algorithm for realizing these transfers includes the following steps:

[1] calculating part of J and K;

[2] P(i, j) sending K(RU) stored therein to P(i, j+1) when the transfer condition holds;

[3] P(i, j) receiving K(RU) having been stored by P(i, j−1) when the transfer condition holds;

[4] P(i, j) sending D(TS) stored therein to P(i+1, j);

[5] P(i, j) receiving D(TS) having been stored by P(i−1, j);

[6] P(k) sending D(TU) stored therein to P(k+1);

[7] P(k) receiving D(TU) having been stored by P(k−1);

[8] iterating steps [1] to [7] as many times as the number of nodes; and

[9] calculating Fock matrix F.

Here, k=(j−1)$i_{max}$+i. Also in this method, the distribution state returns to the initial state (S-0) when all transfers have been completed.

EXAMPLE 3

Quadruple Cyclical Density Matrix Scheme, Part-1

Next, a mode called a quadruple cyclical density matrix scheme will be described. In this mode, density matrix D and its duplications, four in total, are prepared, and the symmetry between (rs|tu)⇔(tu|rs) in two-electron integration is made use of to further reduce calculation of integrals compared to the double cyclical density matrix scheme, hence reduce calculation time. The symbols used here are the same as those used in the aforementioned cyclical density matrix scheme. In this scheme, Eq. (7) is decomposed as in Eqs. (22) to (24).

$$
\left.\begin{aligned}
F_{rs} &= H_{rs} + J_{rs} - \frac{1}{2}K_{rs} \\
J_{rs} &= J1_{rs} + J2_{rs} \\
K_{ru} &= K1_{ru} + K2_{ru} \\
J1_{rs} &= \sum_{t=1, m<=n}^{N} \sum_{u=1, m<=n}^{N} D_{tu}(rs|tu)d(m,n) \\
J2_{tu} &= \sum_{r=1, m<=n}^{N} \sum_{s=1, m<=n}^{N} D_{rs}(rs|tu)d(m,n) \\
K1_{ru} &= \sum_{t=1, m<=n}^{N} \sum_{s=1, m<=n}^{N} D_{ts}(rs|tu)d(m,n) \\
K2_{ts} &= \sum_{r=1, m<=n}^{N} \sum_{u=1, m<=n}^{N} D_{ru}(rs|tu)d(m,n)
\end{aligned}\right\} \quad (22)
$$

$$m=(s-1)N+r,\; n=(u-1)N+t, \quad (23)$$

$$d(m,n)=1 \text{ for } m \neq n,\; \tfrac{1}{2} \text{ for } m=n \quad (24)$$

This represents that Coulomb integral J and exchange integral K are calculated by dividing them into two matrixes, using numeral m that is uniquely specified by r and s and numeral n that is uniquely specified by t and u. A two-electron integral (rs|tu) is represented as (m|n) using m and n. Since two-electron integration has symmetry such as (rs|tu)=(tu|rs), from condition m≦n and when (m|n) is regarded as a matrix, J1 and K1 correspond to calculations of the lower triangular portion of matrix (m|n), and J2 and K2 correspond to calculations of the upper triangular portion of matrix (m|n). Here, for the time being, the condition m≦n is put aside, Eq. (22) is written down as calculations for every region and every node, as shown in Eqs. (25) and (26).

$$P11: F(11) = H(11) + J(11) - 1/2*K(11), \quad J(11) = J1(11) + J2(11), \quad K(11) = K1(11) + K2(11)$$
$$P21: F(21) = H(21) + J(21) - 1/2*K(21), \quad J(21) = J1(21) + J2(21), \quad K(21) = K1(21) + K2(21)$$
$$P12: F(12) = H(12) + J(12) - 1/2*K(12), \quad J(12) = J1(12) + J2(12), \quad K(12) = K1(12) + K2(12)$$
$$P22: F(22) = H(22) + J(22) - 1/2*K(22), \quad J(22) = J1(22) + J2(22), \quad K(22) = K1(22) + K2(22) \quad (25)$$

$$P11: J1(11) = D(aa)(11|aa)/2, \quad J1(11) = D(bb)(11|bb), \quad J1(11) = D(ab)(11|ab), \quad J1(11) = D(ba)(11|ba)$$
$$P21: J1(21) = D(ba)(21|ba)/2, \quad J1(21) = D(aa)(21|aa), \quad J1(21) = D(bb)(21|bb), \quad J1(21) = D(ab)(21|ab)$$
$$P12: J1(12) = D(ab)(12|ab)/2, \quad J1(12) = D(ba)(12|ba), \quad J1(12) = D(aa)(12|aa), \quad J1(12) = D(bb)(12|bb)$$
$$P22: J1(22) = D(bb)(22|bb)/2, \quad J1(22) = D(ab)(22|ab), \quad J1(22) = D(ba)(22|ba), \quad J1(22) = D(aa)(22|aa) \quad (26)$$

$$P11: J2(aa) = D(11)(11|aa)/2, \quad J2(bb) = D(11)(11|bb), \quad J2(ab) = D(11)(11|ab), \quad J2(ba) = D(11)(11|ba)$$
$$P21: J2(ba) = D(21)(21|ba)/2, \quad J2(aa) = D(21)(21|aa), \quad J2(bb) = D(21)(21|bb), \quad J2(ab) = D(21)(21|ab)$$
$$P12: J2(ab) = D(12)(12|ab)/2, \quad J2(ba) = D(12)(12|ba), \quad J2(aa) = D(12)(12|aa), \quad J2(bb) = D(12)(12|bb)$$
$$P22: J2(bb) = D(22)(22|bb)/2, \quad J2(ab) = D(22)(22|ab), \quad J2(ba) = D(22)(22|ba), \quad J2(aa) = D(22)(22|aa)$$

$$P11: K1(1a) = D(a1)(11|aa)/2, \quad K1(1b) = D(b1)(11|bb), \quad K1(1b) = D(a1)(11|ab), \quad K1(1a) = D(b1)(11|ba)$$

$$P21: K1(2a) = D(b1)(21|ba)/2, \quad K1(2a) = D(a1)(21|aa), \quad K1(2b) = D(b1)(21|bb), \quad K1(2b) = D(a1)(21|ab)$$

$$P12: K1(1b) = D(a2)(12|ab)/2, \quad K1(1a) = D(b2)(12|ba), \quad K1(1a) = D(a2)(12|aa), \quad K1(1b) = D(b2)(12|bb)$$

$$P22: K1(2b) = D(b2)(22|bb)/2, \quad K1(2b) = D(a2)(22|ab), \quad K1(2a) = D(b2)(22|ba), \quad K1(2a) = D(a2)(22|aa)$$

$$P11: K2(a1) = D(1a)(11|aa)/2, \quad K2(b1) = D(1b)(11|bb), \quad K2(a1) = D(1b)(11|ab), \quad K2(b1) = D(1a)(11|ba)$$

$$P21: K2(b1) = D(2a)(21|ba)/2, \quad K2(a1) = D(2a)(21|aa), \quad K2(b1) = D(2b)(21|bb), \quad K2(a1) = D(2b)(21|ab)$$

$$P12: K2(a2) = D(1b)(12|ab)/2, \quad K2(b2) = D(1a)(12|ba), \quad K2(a2) = D(1a)(12|aa), \quad K2(b2) = D(1b)(12|bb)$$

$$P22: K2(b2) = D(2b)(22|bb)/2, \quad K2(a2) = D(2b)(22|ab), \quad K2(b2) = D(2a)(22|ba), \quad K2(a2) = D(2a)(22|aa)$$

As the order of transfer of each matrix for realizing this calculation, the same order as that in the double cyclical density matrix scheme is used. Matrixes J1(RS) and D(RS) are transferred in accordance with FIG. 4, matrixes D(TU) and J2(TU) in accordance with FIG. 5, matrixes K1(RU) and D(RU) in accordance with FIG. 6, and matrixes D(TS) and K2(TS) in accordance with FIG. 7. That is, the way of transfer is different from each other depending on the regions (RS), (TU), (RU) and (TS). Next, in order to enable the condition to be applied to each region, numerals m and n are rewritten as Eq. (27).

$$m=(j-1)i_{max}+i(i,j=\{1,2\}), n=(l-1)k_{max}+k(k,l=\{a,b\}) \quad (27)$$

where, i and j denote the numbers {1, 2} in regions R and S, k and l denote the numbers {a, b} in regions T and U. Here, a and b are converted so that a=1 and b=2. There are several possible conditions using m and n to perform calculations by dividing matrix J into J1 and J2 and matrix K into K1 and K2.

| | |
|---|---|
| $m \geq n$ | Condition (C-1) |
| $m \leq n$ | Condition (C-2) |
| $m=n$, $m+n$=odd for $m<n$, $m+n$=even for $m>n$ | Condition (C-3) |
| $m=n$, $m+n$=odd for $m>n$, $m+n$=even for $m<n$ | Condition (C-4) |

For example, conditions (c-1) and (c-3) are adopted, J1, J2, K1 and K2 are calculated as follows.

When condition (c-1) is adopted, the calculations of J1, J2, K1 and K2 are represented in Eq. (28).

$$P11: J1(11) = D(aa)(11|aa)/2, \quad J1(11) = D(bb)(11|bb), \quad J1(11) = D(ab)(11|ab), \quad J1(11) = D(ba)(11|ba)$$
$$P21: J1(21) = D(ba)(21|ba)/2, \quad\quad\quad J1(21) = D(bb)(21|ab), \quad J1(21) = D(ab)(21|ab)$$
$$P12: J1(12) = D(ab)(12|ab)/2, \quad\quad\quad\quad\quad\quad\quad\quad\quad\quad J1(12) = D(bb)(12|bb)$$
$$P22: J1(22) = D(bb)(22|bb)/2, \quad\quad\quad\quad\quad\quad\quad\quad (28)$$

-continued $P11:J2(aa) = D(11)(11|aa)/2, \quad J2(bb) = D(11)(11|bb), \quad J2(ab) = D(11)(11|ab), \quad J2(ba) = D(11)(11|ba)$
$P21:J2(ba) = D(21)(21|ba)/2, \quad\quad\quad\quad\quad\quad\quad\quad\quad J2(bb) = D(21)(21|bb), \quad J2(ab) = D(21)(21|ab)$
$P12:J2(ab) = D(12)(12|ab)/2,\quad\quad\quad\quad\quad\quad\quad\quad\quad\quad\quad\quad\quad\quad\quad\quad\quad\quad\quad J2(bb) = D(12)(12|bb)$
$P22:J2(bb) = D(22)(22|bb)/2,$ $P11:K1(1a) = D(a1)(11|aa)/2, \quad K1(1b) = D(b1)(11|bb), \quad K1(1b) = D(a1)(11|ab), \quad K1(1a) = D(b1)(11|ba)$
$P21:K1(2a) = D(b1)(21|ba)/2, \quad\quad\quad\quad\quad\quad\quad\quad\quad K1(2b) = D(b1)(21|bb), \quad K1(2b) = D(a1)(21|ab)$
$P12:K1(1b) = D(a2)(12|ab)/2,\quad\quad\quad\quad\quad\quad\quad\quad\quad\quad\quad\quad\quad\quad\quad\quad\quad\quad\quad K1(1b) = D(b2)(12|bb)$
$P22:K1(2b) = D(b2)(22|bb)/2,$ $P11:K2(a1) = D(1a)(11|aa)/2, \quad K2(b1) = D(1b)(11|bb), \quad K2(a1) = D(1b)(11|ab), \quad K2(b1) = D(1a)(11|ba)$
$P21:K2(b1) = D(2a)(21|ba)/2, \quad\quad\quad\quad\quad\quad\quad\quad\quad K2(b1) = D(2b)(21|bb), \quad K2(a1) = D(2b)(21|ab)$
$P12:K2(a2) = D(1b)(12|ab)/2,\quad\quad\quad\quad\quad\quad\quad\quad\quad\quad\quad\quad\quad\quad\quad\quad\quad\quad\quad K2(b2) = D(1b)(12|bb)$
$P22:K2(b2) = D(2b)(22|bb)/2,$ When condition (c-3) is adopted, the calculations of J1, J2, K1 and K2 are represented in Eq. (29).

$$\begin{aligned}
&P11:J1(11) = D(aa)(11|aa)/2, \quad J1(11) = D(bb)(11|bb), \quad\quad\quad\quad\quad\quad\quad J1(11) = D(ba)(11|ba) \\
&P21:J1(21) = D(ba)(21|ba)/2, \quad\quad\quad\quad\quad\quad\quad\quad\quad\quad\quad\quad\quad\quad\quad J1(21) = D(ab)(21|ab) \\
&P12:J1(12) = D(ab)(12|ab)/2, \quad\quad\quad\quad\quad\quad\quad J1(12) = D(aa)(12|aa), \quad J1(12) = D(bb)(12|bb) \\
&P22:J1(22) = D(bb)(22|bb)/2, \quad\quad\quad\quad\quad\quad\quad J1(22) = D(ba)(22|ba), \\
\\
&P11:J2(aa) = D(11)(11|aa)/2, \quad J2(bb) = D(11)(11|bb), \quad\quad\quad\quad\quad\quad\quad J2(ba) = D(11)(11|ba) \\
&P21:J2(ba) = D(21)(21|ba)/2, \quad\quad\quad\quad\quad\quad\quad\quad\quad\quad\quad\quad\quad\quad\quad J2(ab) = D(21)(21|ab) \\
&P12:J2(ab) = D(12)(12|ab)/2, \quad\quad\quad\quad\quad\quad\quad J2(aa) = D(12)(12|aa), \quad J2(bb) = D(12)(12|bb) \\
&P22:J2(bb) = D(22)(22|bb)/2, \quad\quad\quad\quad\quad\quad\quad J2(ba) = D(22)(22|ba), \\
\\
&P11:K1(1a) = D(a1)(11|aa)/2, \quad K1(1b) = D(b1)(11|bb), \quad\quad\quad\quad\quad\quad\quad K1(1a) = D(b1)(11|ba) \\
&P21:K1(2a) = D(b1)(21|ba)/2, \quad\quad\quad\quad\quad\quad\quad\quad\quad\quad\quad\quad\quad\quad\quad K1(2b) = D(a1)(21|ab) \\
&P12:K1(1b) = D(a2)(12|ab)/2, \quad\quad\quad\quad\quad\quad\quad K1(1a) = D(a2)(12|aa), \quad K1(1b) = D(b2)(12|bb) \\
&P22:K1(2b) = D(b2)(22|bb)/2, \quad\quad\quad\quad\quad\quad\quad K1(2a) = D(b2)(22|ba), \\
\\
&P11:K2(a1) = D(1a)(11|aa)/2, \quad K2(b1) = D(1b)(11|bb), \quad\quad\quad\quad\quad\quad\quad K2(b1) = D(1a)(11|ba) \\
&P21:K2(b1) = D(2a)(21|ba)/2, \quad\quad\quad\quad\quad\quad\quad\quad\quad\quad\quad\quad\quad\quad\quad K2(a1) = D(2b)(21|ab) \\
&P12:K2(a2) = D(1b)(12|ab)/2, \quad\quad\quad\quad\quad\quad\quad K2(a2) = D(1a)(12|aa), \quad K2(b2) = D(1b)(12|bb) \\
&P22:K2(b2) = D(2b)(22|bb)/2, \quad\quad\quad\quad\quad\quad\quad K2(b2) = D(2a)(22|ba),
\end{aligned} \quad (29)$$

The amounts of calculation at all the nodes become relatively leveled off when conditions (c-3) and (c4) are adopted. As a result, the calculation algorithm is given as the following steps of:

[1] calculating part of J1, J2, K1 and K2 when any of conditions (c-1) to (c-4) holds;

[2] P(i, j) sending K1(RU) and D(RU) stored therein to P(i, j+1) when the transfer condition holds;

[3] P(i, j) receiving K1(RU and D(RU) having been stored by P(i, j−1) when the transfer condition holds;

[4] P(i, j) sending K2(TS) and D(TS) stored therein to P(i+1, j);

[5] P(i, j) receiving K2(TS) and D(TS) having been stored by P(i−1, j);

[6] P(k) sending J2(TU) and D(TU) stored therein to P(k+1);

[7] P(k) receiving J2(TU) and D(TU) having been stored by P(k−1);

[8] iterating steps [1] to [7] as many times as the number of nodes;

[9] calculating J and K; and

[10] calculating F.

Here, the node numbers are renamed as in Eq. (30).

$$\left.\begin{array}{l} P(1) = P(1, 1) = P11, \\ P(2) = P(2, 1) = P21, \\ P(3) = P(1, 2) = P12, \\ P(4) = P(2, 2) = P22 \end{array}\right\} \quad (30)$$

EXAMPLE 4

Quadruple Cyclical Density Matrix Scheme, Part-2

Next, another example of a mode called a quadruple cyclical density matrix scheme will be described.

Figures 8, 9:
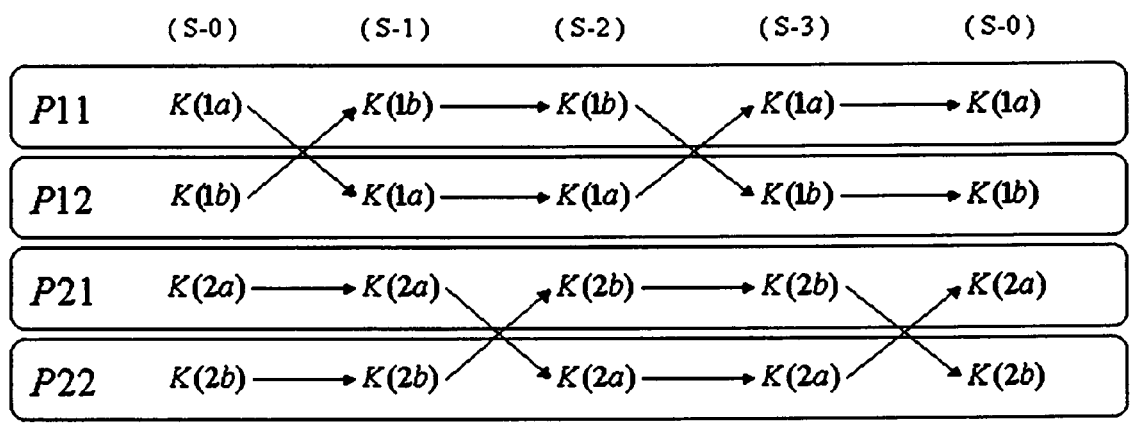
FIG. 8 is a rewritten chart of the order of transfer shown In FIG. 6, for easy understanding.
FIG. 9 is a chart for illustrating the presence or absence of calculation of two-electron integrals when two-electron integral (RS|TU) is rewritten as (m|n) and regarded as a matrix in the case where the number of node is 4.

In the aforementioned quadruple cyclical density matrix scheme, another method can be used to perform calculation under conditions (c-3) and (c4) only when the number of nodes are odd. The cases of calculating two-electron integration (rs|tu)–(m|n) for every region where condition (c-3) holds and the number of nodes is 4 or 9 are illustrated in FIGS. 9 and 10. A white square portion indicates a two-electron integral (m|n) to be calculated whereas a black square portion indicates a (m|n) that is not calculated in accordance with condition (c-3). For each node $P(i,j)=(i,j=\{1,2\}$ or $\{1,2,3\})$, calculations are made in a row from side to side. Calculations are carried out in such an order that diagonal components (m|m) are calculated first, then (m|m-1) is calculated after transfer. The numerals in the squares in FIGS. 9 and 10 denote the order of calculation. When the number of nodes is 9, the squares corresponding to 2, 4, 6 and 8 are black at all the nodes, meaning that no two-electron integral is calculated there. When the number of nodes is odd, the calculation is performed by tracing black square portions and white square portions alternately as transfer is iterated. When the number of nodes is 4, any set of the squares of the same number necessarily includes at least one white square portion; this can be generalized to all the cases where the number of nodes is even. In conclusion, when the number of nodes is odd, it is adequate to only perform calculations corresponding to the square portions of 1 3, 5, 7 and 9, meaning that transfer can be done skipping one step. It is noted that for the last state, transfer should be done by a single step. The computing algorithm in this case includes the following steps of:

[1] calculating part of J1, J2, K1 and K2;
[2] P(i,j) sending K1(RU) and D(RU) stored therein to P(i, j+1) when the transfer condition holds;
[3] P(i,j) receiving K1(RU) and D(RU) having been stored by P(i, j–1) when the transfer condition holds;
[4] P(i, j) sending K2(TS) and D(TS) stored therein to P(i+2, j);
[5] P(i, j) receiving K2(TS) and D(TS) having been stored by P(i–2, j);
[6] P(k) sending J2(TU) and D(TU) stored therein to P(k+2);
[7] P(k) receiving J2(TU) and D(TU) having been stored by P(k–2);
[8] iterating steps [1] to [7] as many times as the number corresponding to (the number of nodes)/2;
[9] calculating part of J1, J2, K1 and K2;
[10] P(i, j) sending K1(RU) and D(RU) stored therein to P(i, j+1) when the transfer condition holds;
[11] P(i, j) receiving K1(RU) and D(RU) having been stored by P(i, j–1) when the transfer condition holds;
[12] P(i, j) sending K2(TS) and D(TS) stored therein to P(i+1, j);
[13] P(i, j) receiving K2(TS) and D(TS) having been stored by P(i–1, j);
[14] P(k) sending J2(TU) and D(TU) stored therein to P(k+1);
[15] P(k) receiving J2(TU) and D(TU) having been stored by P(k–1);
[16] calculating J and K; and
[17] calculating F.

When condition (c4) holds, it is possible to perform calculation by reversing the order of transfer or by performing the last transfer first. Specifically, the above algorithm may and should be executed in the order Of [9], ..., [15], [1], ..., [8].

EXAMPLE 5

Generalization

The different kinds of cyclical density matrix schemes described above can be applied to computation for a case with the number of nodes being N and the number of division being M (>N). In this case it is necessary to divide each matrix in the same manner. That is, the number in region R and that in region T need to correspond to each other, and the number in region S and that in region U need to correspond to each other. The "quadruple cyclical density matrix scheme, Type-2" can be generalized into the following algorithm, including the steps of:

[1] calculating part of J1, J2, K1 and K2 when condition (c-3) holds;
[2] P(i, j) sending K1(RU) and D(RU) stored therein to P(i, j+1) when the transfer condition holds;
[3] P(i, j) receiving K1(RU) and D(RU) having been stored by P(i, j–1) when the transfer condition holds;
[4] P(i, j) sending K2(TS) and D(TS) stored therein to P(i+2, j);
[5] P(i, j) receiving K2(TS) and D(TS) having been stored by P(i–2, j);
[6] P(k) sending J2(TU) and D(TU) stored therein to P(k+2);
[7] P(k) receiving J2(TU) and D(TU) having been stored by P(k–2);
[8] calculating part of J1, J2, K1 and K2;
[9] P(i, j) sending K1(RU) and D(RU) stored therein to P(i, j+1) when the transfer condition holds;
[10] P(i, j) receiving K1(RU) and D(RU) having been stored by P(i, j–1) when the transfer condition holds;
[11] P(i, j) sending K2(TS) and D(TS) stored therein to P(i+2, j);
[12] P(i, j) receiving K2(TS) and D(TS) having been stored by P(i–2, j);
[13] P(k) sending J2(TU) and D(TU) stored therein to P(k+2);
[14] P(k) receiving J2(TU) and D(TU) having been stored by P(k–2);
[15] iterating steps [8] to [14] as many times as the number corresponding to {(the number of nodes)/2-1};
[16] calculating part of J1, J2, K1 and K2;
[17] P(i, j) sending K1(RU) and D(RU) stored therein to P(i, j+1) when the transfer condition holds;
[18] P(i,j) receiving K1(RU) and D(RU) stored by P(i, j–1) when the transfer condition holds;
[19] P(i, j) sending K2(TS) and D(TS) stored therein to P(i+1, j);
[20] P(i, j) receiving K2(TS) and D(TS) stored by P(i–1, j);
[21] P(k) sending J2(TU) and D(TU) stored therein to P(k+1);

[22] P(k) receiving J2(TU) and D(TU) having been stored by P(k−1);

[23] calculating J and K; and

[24] calculating F.

When condition (c-4) holds, it is possible to perform calculation by reversing the order of transfer or by performing the first transfer by a single step only.

Thus, the preferred embodiments of the present invention have been described, the present invention is realized on the basis of a computer cluster. Accordingly, each computer as a constituent of the computer cluster has to be one that executes the aforementioned process at each node. Each computer loads a computer program for realizing the processes as a node and executes the program so as to perform each of the aforementioned processes. Such a program is loaded by the computer from a recording medium such as magnetic tape and CD-ROM, or via a network.

Specifically, the program causes a computer at each node in a computer cluster constituted by a plurality of nodes, to function as: a matrix storage for storing density submatrixes which are divided from a density matrix; a transfer controller for performing transmission and reception of the density submatrixes with respect to the other nodes in the computer cluster, and a calculation processor for performing a calculation on the density submatrix stored in the matrix storage, whereby calculation processes on the density submatrixes are executed at each of the nodes while the multiple density submatrixes are being sequentially transferred between the multiple nodes.

Further, the scope of the present invention also includes program products of the above program, mechanically readable recording media storing this program and transmission media for transmitting this program.

The invention claimed is:

1. A parallel computing method for executing calculation of the Hartree-Fock method in a molecular orbital method for a target molecule of a biological material, comprising the steps of:

using a computer cluster made up of a plurality of computers and a communication device coupled to said plurality of computers, each of said plurality of computers comprising a matrix storage having a memory capacity which is insufficient to store whole matrices used in Hartree-Fock calculation;

dividing a density matrix, which is defined by molecular orbital coefficients of the target molecule, into multiple density submatrixes and distributing the multiple density submatrixes to the multiple computers and storing the distributed multiple density matrixes in the respective matrix storages;

executing, in parallel in the plurality of the computers, calculation processes including two-electron integrations on the density submatrixes stored in the matrix storages of the respective computers to update the stored density submatrixes based on the result of the two-election integration; and in each of the computers sequentially transferring the density submatrixes stored in the matrix storage to one of other computers according to order of transfer via said communication device, and storing the density submatrixes, which are transferred thereto via said communication device, in the matrix storage, wherein the executing and transferring steps are repeated at the number of times which corresponds to the number of the computers to subject all of the density submatrixes to the calculation processes by sequentially transferring the density submatrixes between the computers, and a Fock matrix of the target molecule is obtained by adding an H-core matrix to the combination of resultant submatrixes stored in said matrix storages of said plurality of computers.

2. The method according to claim 1, wherein a duplication of the density matrix is used, and the density matrix and the duplication are individually divided into density submatrixes, causing the density submatrixes to transfer between the computers via said communication device to thereby reduce calculation of integrals.

3. The method according to claim 1, wherein the density matrix and duplications of the density matrix, four in total, are used, and the density matrix and the duplications are individually divided into density submatrixes, causing the density submatrixes to transfer between the computers via said communication device, to thereby reduce calculation of integrals, by using symmetry of (rs|tu)⇔(tu|rs) in two-electron integration.

4. A parallel computing system for executing calculation of the Hartree-Fock method in a molecular orbital method for a target molecule of a biological material, comprising:

a computer cluster made up of a plurality of computers and a communication device coupled to said plurality of computers, each of the computers comprising a matrix storage for storing density submatrixes which are divided from a density matrix, which is defined by molecular orbital coefficients of the target molecule; a transfer controller for performing transmission and reception of the density submatrixes with respect to the other computers in the computer cluster; and a calculation processor for performing a calculation process on the density submatrix stored in the matrix storage, wherein said each matrix storage has a memory capacity which is insufficient to store whole matrices used in Hartree-Fock calculation, wherein the density matrix is divided into multiple density submatrixes, and the multiple submatrixes are distributed to the multiple computers and stored in the matrix storages of the respective computers as initial values, wherein calculation processes including two-electron integrations on the density submatrixes are executed in parallel in the plurality of the computers while the multiple density submatrixes are being sequentially transferred between the multiple computers via said communication device, wherein, in each of the computers, the density submatrixes stored in the matrix storage is transferred to one of other computers according to order of transfer, and the density submatrixes which are transferred thereto are store in the matrix storage, wherein the execution of the calculation processes and transferring are repeated at the number of times which corresponds to the number of the computers to subject all of the density submatrixes to the calculation processes, and wherein a Fock matrix of the target molecule is obtained by adding an H-core matrix to the combination of resultant submatrices stored in said matrix storages of said plurality of computers.

5. The system according to claim 4, wherein said storage stores two groups of the density submatrices which are obtained by individually dividing the density matrix and a duplication of the density matrix, the two groups of the density submatrixes are transferred between the computers via said communication device, to thereby reduce calculation of integrals.

6. The system according to claim 4, wherein said storage stores four groups of the density submatrices which are obtained by individually dividing the density matrix and duplications of the density matrix, four in total, and the four groups of the density submatrixes are transferred between the computers via said communication device, to thereby reduce calculation of integrals, by using symmetry of (rs|tu)⇔(tu|rs) in two-electron integration.

7. A computer readable medium storing a computer program causing a computer at each node in a computer cluster constituted by a plurality of nodes and a communication device coupled to said plurality of nodes, to function as:
a matrix storage for storing density submatrixes which are divided from a density matrix; which is defined by molecular orbital coefficients of a target molecule of a biological material; a transfer controller for performing transmission and reception of the density submatrixes with respect to the other nodes in the computer cluster; and a calculation processor for performing a calculation process on the density submatrix stored in the matrix storage,
whereby said each matrix storage has a memory capacity which is insufficient to store whole matrices used in Hartree-Fock calculation,
whereby the density matrix is divided into multiple density submatrixes, and the multiple submatrixes are distributed to the multiple computers and stored in the matrix storages of the respective nodes as initial values,
wherein calculation processes including two-electron integrations on the density submatrixes are executed in parallel at the plurality of the nodes while the multiple density submatrixes are being sequentially transferred between the multiple nodes via said communication device, wherein, in each of the computers, the density submatrixes stored in the matrix storage is transferred to one of other computes according to order of transfer, and the density submatrixes which are transferred thereto are store in the matrix storage,
wherein the execution of the calculation processes and transferring are repeated at the number of times which corresponds to the number of the nodes to subject all of the density submatrixes to the calculation processes, and
wherein a Fock matrix of the target molecule is obtained by adding an H-core matrix to the combination of resultant submatrices stored in said matrix storages of said plurality of nodes.

8. The method according to claim 1, further comprising:
computing, using the obtained Fock matrix of the target molecule, precise simulations of structures and physical properties of the target molecule, and chemical bonds, molecular orbitals and electron states in the target molecule,
wherein no high-performance computers are included in said plurality of computers making up the computer cluster.

9. The system according to claim 4, wherein the obtained Fock matrix of the target molecule is used to obtain precise simulations of structures and physical properties of the target molecule, and chemical bonds, molecular orbitals and electron states in the target molecule, and
wherein no high-performance computers are included in said plurality of computers making up the computer cluster.

10. The computer readable storage medium according to claim 7, wherein the obtained Fock matrix of the target matrix is used to obtain precise simulations of structures and physical properties of the target molecule, and chemical bonds, molecular orbitals and electron states in the target molecule, and
wherein no high-performance computers are included in said plurality of computers making up the computer cluster.

* * * * *